Sept. 6, 1932.  Y. OKADA  1,875,485

BELT CONVEYER SCALE OR THE LIKE

Filed Dec. 29, 1931  2 Sheets-Sheet 1

Inventor:
Yoshinobu Okada
By Emil Bömelyche
Attorney

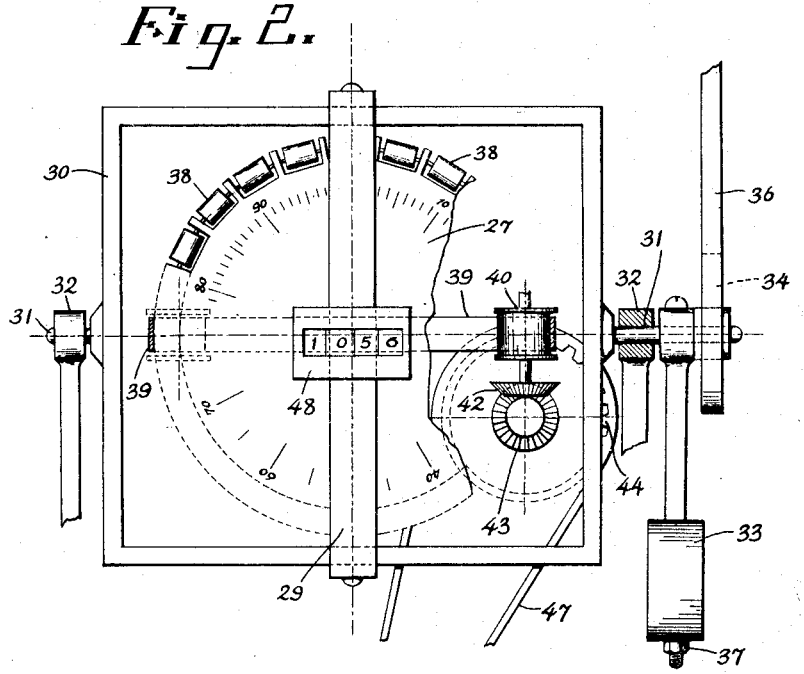
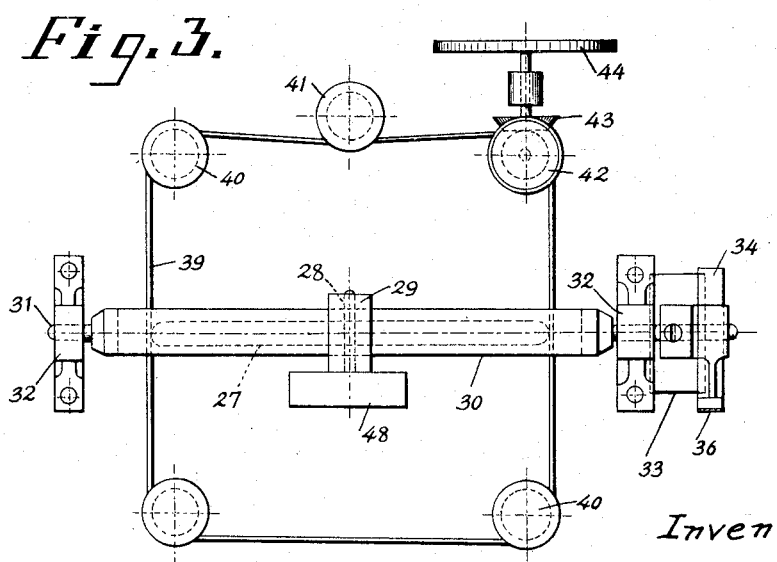

Patented Sept. 6, 1932

1,875,485

UNITED STATES PATENT OFFICE

YOSHINOBU OKADA, OF IKEGAMI-CHO, JAPAN

BELT CONVEYER SCALE OR THE LIKE

Application filed December 29, 1931, Serial No. 583,775, and in Japan October 3, 1931.

This invention relates to improvements in automatic weighing apparatus known as a Merrick-scale or weightometer for weighing the sum total of the material conveyed by any form of belt or pan conveyer or other transporting means such as a train of cars.

The object of my invention is in obviating the disadvantages which have heretofore been experienced in this sort of apparatus and providing a conveyer scale of integrating type in which the maximum inclination of the integrating disc can be very much increased without jeopardizing the accuracy of measurement.

In the weighing apparatus of this sort hitherto in use, the main scale beam is maintained in stable equilibrium by means of a pendulum provided thereon or an iron float partially submerged in a mercury cylinder, and an end of the main scale beam is connected to the integrating disc by means of a connecting rod and a crank, the system including the disc being maintained in neutral equilibrium.

In contradistinction thereto, in my invention, the lever system including a scale beam is maintained in neutral equilibrium, while the system including the integrating disc is maintained in stable equilibrium by providing a pendulum on a frame rotatably supporting the disc, the moment of force being transmitted through the intermediary of a circular cam and a steel tape hung over it.

Owing to this construction, in the apparatus of my invention, the maximum inclination of the integrating disc can be increased as far as 80 degrees, instead of below 25 degrees as in the apparatus heretofore, thus exceedingly increasing the sensitivity of the apparatus.

The accompanying drawings illustrate the preferable form of the apparatus according to my invention in which, Fig. 1 is an elevation diagrammatically representing the entire construction of the apparatus in co-operation with a conveyer belt.

Fig. 2 is an enlarged front elevation, partially broken away, of the integrating mechanism.

Fig. 3 is a plan view of the same.

Figure 1:
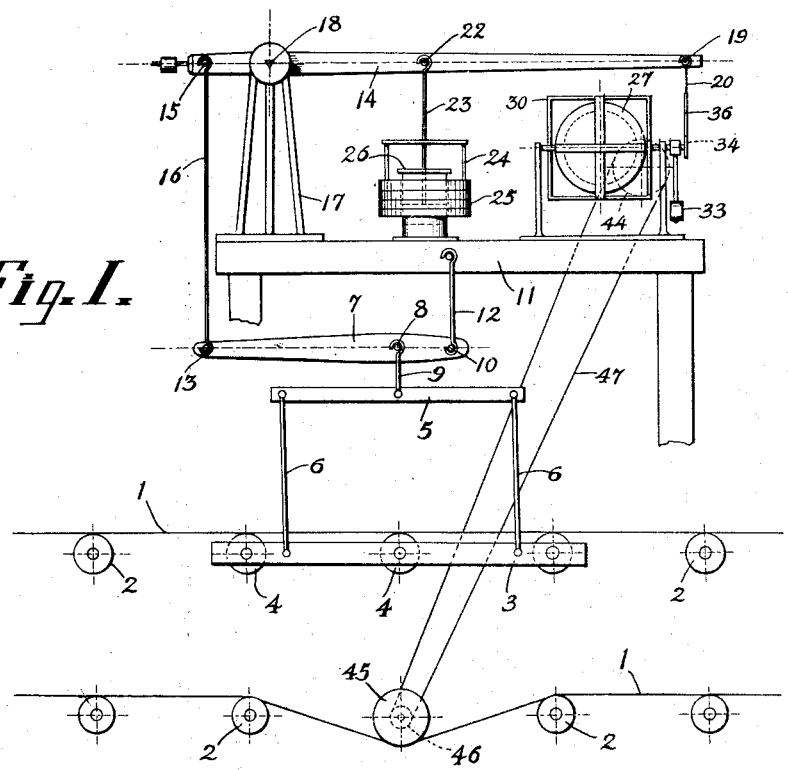

Referring to the drawings, in Fig. 1, 1 is a belt conveyer movable on a plurality of stationary rollers 2. 3 is a floating platform disposed at a suitable position of the passage way of the belt 1. The belt 1 also rolls along the rollers 4 provided on the floating platform. The floating platform 3 is suspended from a cross bar 5 by means of a pair of suspension rods 6, and the cross bar 5 is in turn hanged at the middle point thereof from an intermediate scale beam 7, as from the pivotal point 8, by means of a rod 9. One end of the intermediate scale beam, which is nearer the pivotal point 8, is pivotally connected, as at 10, to a stationary floor plate 11 by means of a rod 12, while the other end is pivotally connected, as at 13, to one end of the main scale beam 14, as at 15, by means of a connecting rod 16.

Fixed on the floor plate 11 is a standard 17 pivotally supporting the main scale beam 14, at fulcrum 18, which is situated near the load end 15. From the counterpoise end of the main scale beam 14 is suspended, as at 19, a rod 20, the lower end of which is connected to a steel tape 36, which is in turn hung around the circular cam of the automatic weight integrating mechanism to be described in detail hereinbelow. From a suitable point 22, intermediately of the fulcrum 18 and the counterpoise end 19, of the main scale beam 14, is suspended, by means of a rod 23 and a frame work 24, a counterweight 25 exactly balancing the entire scale system including the scale beams, the rods and the floating platform. 26 is a dash pot consisting of a cylinder fixed to the floor plate 11 and a piston moving in the cylinder and connected to the rod 23, to dampen the vibrations of the entire scale system.

Owing to the fact that the pivotal points 8, 10 and 13 and the centre of gravity of the intermediate scale beam on one hand, and the pivotal points 15, 18, 19 and 22 and the centre of gravity of the main scale beam on the other hand, are collinear, the system consisting of two scale beams is in neutral equilibrium. This fact constitutes one of the main characteristics of my invention.

Figure 4:
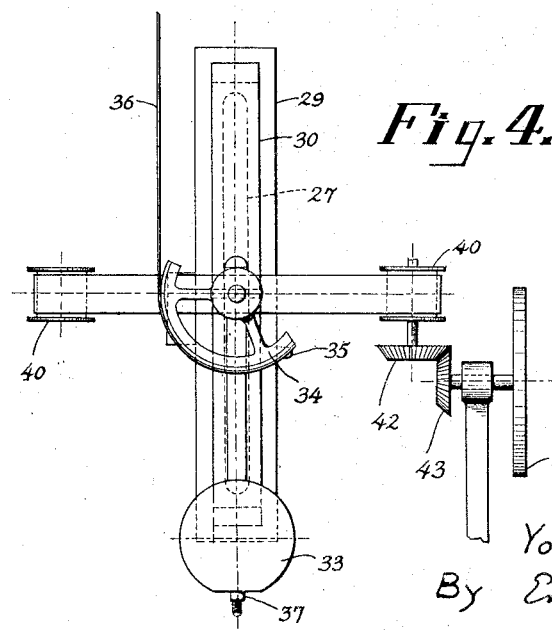
Fig. 4 is a side elevation thereof.

Figures 2 to 4 illustrate the details of the integrating mechanism according to my invention, in which 27 is an integrating disc preferably made of a light metal alloy and adapted to rotate about the horizontal axis 28, which is rigid with the disc 27 and journalled in a frame 29. The frame 29 is again fixed to another frame 30, whose plane is parallel to the plane of rotation of the disc 27.

Projecting horizontally from both sides of the frame 30 and in perpendicular relation with the axis of rotation 28 are a pair of axles 31, 31 journalled in the pedestals 32, 32 enabling the disc 27 to turn round these axles while rotating about its own axis 28. One of the axles 31, 31 is outwardly extended, and rigidly mounted on this extended portion are a pendulum 33 and a semi-circular cam 34. At one end of the periphery of the cam is fixed, as at 35, the outer end of a steel tape 36 which is hung around the periphery to be brought upwardly and connected to the connecting rod 20 provided at the outer end 19 of the main scale beam 14. The pendulum 33 is adjustable by means of a nut 37, so that the center of gravity of the system oscillating about the horizontal axle 31 may be suitably varied.

The fact that the equilibrium of the oscillating system including the integrating disc is made stable by means of the pendulum 33 and the use of the circular cam to transmit the moment of force to the disc constitute other important characteristics of my invention.

Provided along the entire periphery of the integrating disc 27 are a multitude of small rollers 38 turnable about the respective axes which are in tangential relation with reference to the periphery of the integrating disc. In rubbing contact with the periphery of the integrating disc at its diametrically opposite points is an endless belt 39 guided by four rollers 40, to be driven in a horizontal path. 41 is an adjustable roller for regulating the tension of the endless belt 39.

Directly coupled to one of the rollers 40 is a bevel gear 42 meshing with another bevel gear 43 rigid with a sprocket wheel 44. Bearing on the conveyor belt 1 is a roller 45 rigid with a sprocket 46. The two sprocket wheels 44 and 46 are operatively connected together by means of an endless chain 47.

In this manner, the motion of the conveyer belt 1 is transmitted to the horizontally operating endless belt 39, and the latter travels at a speed which is proportional to the speed of the former.

The number of turns of the integrating disc 27 is measured by a gear mechanism 48 of any conventional type and its total number of turns or rather the gross weight which has traversed the floating platform 3 may be indicated on the dial of the indicator. Fractions of weight corresponding to one revolution of the integrating disc may be directly indicated upon the surface of the disc as shown in Fig. 2.

When there is no lead being transported by the conveyor 1, there is no pull acting upwardly along the steel tap 36, and the integrating disc assumes its vertical position. Owing to the fact that the endless belt 39 travels in perpendicular relation with respect to the disc, it simply slides along the diametrically opposite points of the periphery of the disc, causing the two opposite rollers 38 to rotate idly by themselves, and consequently, the disc will not be rotated.

As soon as a load being transported along the conveyer 1 steps over the floating platform 3, however, a force which is proportional to the total weight on the platform at that instant will be transmitted through a series of lever systems to the periphery of the circular cam 34, causing the integrating disc 27 to incline, while a counteracting, restoring moment of force due to the inclination of the stable system consisting of the disc, the cam, the pendulum and the frame will be introduced. An equilibrium will then be established in the whole system including the two scale beams and the disc, at an inclination of the disc, the sine of which is proportional to the instantaneous load on the platform. Since the integrating disc is no longer in perpendicular relation with respect to the travelling endless belt 39, but is inclined to it at an angle, the disc will be driven at a speed proportional to the sine of the angle of inclination, that is, to the instantaneous load. This speed is certainly proportional to the instantaneous speed of the conveyer belt 1. So that, the peripheral velocity of the integrating disc will be proportional to the instantaneous load as well as to the velocity of the conveyer, that is, to the product of these two factors, or the weight being transported per unit of time at that particular moment. And it naturally follows that the weight of material conveyed through the scale in a period of time is proportional to the corresponding number of revolutions of the integrating disc.

What I claim is:

1. An automatic apparatus for integrating the weight being transported, comprising a scale beam in neutral equilibrium, an integrating mechanism in stable equilibrium including a disc and a rotatable frame rotatably supporting the said disc, a circular cam provided on the said frame, and a flexible means connecting the said cam and the said scale beam.

2. An automatic apparatus for integrating the weight being transported, comprising a scale beam in neutral equilibrium, an integrating mechanism in stable equilibrium including a disc and a rotatable frame rotatably supporting the said disc, a pendulum provided on the frame, a circular cam provided also on the frame, and a flexible means connecting the said cam and the said scale beam.

3. An automatic apparatus for integrating the weight being transported, comprising a floating platform, a scale beam in neutral equilibrium, a counterweight provided on the scale beam, an integrating mechanism in stable equilibrium including a disc and a rotatable frame rotatably supporting the said disc, an adjustable pendulum provided on the frame, a circular cam also provided on the frame, and a flexible band connecting the said cam and the said scale beam.

In testimony whereof, I affix my signature.

YOSHINOBU OKADA.